US010183329B2

(12) United States Patent
Gunther (10) Patent No.: US 10,183,329 B2
(45) Date of Patent: Jan. 22, 2019

(54) QUALITY CONTROL OF ADDITIVE MANUFACTURED PARTS

(71) Applicant: The Boeing Company, Seal Beach, CA (US)

(72) Inventor: Steven Matthew Gunther, O'Fallon, IL (US)

(73) Assignee: The Boeing Company, Chicago, IL (US)

( * ) Notice: Subject to any disclaimer, the term of this patent is extended or adjusted under 35 U.S.C. 154(b) by 797 days.

(21) Appl. No.: 13/946,857

(22) Filed: Jul. 19, 2013

(65) Prior Publication Data

US 2015/0024233 A1 Jan. 22, 2015

(51) Int. Cl.
*B23K 9/04* (2006.01)
*B22F 3/105* (2006.01)
(Continued)

(52) U.S. Cl.
CPC ............. *B22F 3/1055* (2013.01); *B23K 9/04* (2013.01); *B29C 64/112* (2017.08); *B29C 64/124* (2017.08); *B29C 64/153* (2017.08); *B29C 64/386* (2017.08); *G05B 19/41875* (2013.01); *B22F 2003/1056* (2013.01); *B22F 2003/1057* (2013.01); *B29L 2031/3076* (2013.01); *B29L 2031/3097* (2013.01); *B33Y 50/02* (2014.12); *G05B 2219/32189* (2013.01); *G05B 2219/37345* (2013.01); *G05B 2219/49023* (2013.01);
(Continued)

(58) Field of Classification Search
None
See application file for complete search history.

(56) References Cited

U.S. PATENT DOCUMENTS 5,848,115 A * 12/1998 Little ................... G01N 23/046
378/4
6,751,516 B1 6/2004 Richardson
(Continued)

FOREIGN PATENT DOCUMENTS

CN 1921970 2/2007
DE 10 2011 113445 3/2013
(Continued)

OTHER PUBLICATIONS

Machine-generated English translation of DE 10 2011 113445, downloaded from lexisnexis.com on Oct. 23, 2014.
(Continued)

*Primary Examiner* — Sean Shechtman
(74) *Attorney, Agent, or Firm* — Dascenzo Intellectual Property Law, P.C.

(57) ABSTRACT

Methods and apparatuses to fabricate additive manufactured parts with in-process monitoring are described. As parts are formed layer-by-layer, a 3D measurement of each layer or layer group may be acquired. The acquisition of dimensional data may be performed at least partially in parallel with the formation of layers. The dimensional data may be accumulated until the part is fully formed, resulting in a part that was completely inspected as it was built. The as-built measurement data may be compared to the input geometrical description of the desired part shape. Where the part fails to meet tolerance, it may be amended during the build process or rejected.

16 Claims, 3 Drawing Sheets

(51) Int. Cl.
*B29L 31/30* (2006.01)
*B33Y 50/02* (2015.01)
*B29C 64/112* (2017.01)
*B29C 64/124* (2017.01)
*B29C 64/153* (2017.01)
*B29C 64/386* (2017.01)
*G05B 19/418* (2006.01)

(52) U.S. Cl.
CPC .............. *Y02P 10/295* (2015.11); *Y02P 80/40* (2015.11); *Y02P 90/22* (2015.11); *Y10T 428/12396* (2015.01); *Y10T 428/24802* (2015.01)

(56) References Cited

U.S. PATENT DOCUMENTS

| | | | |
|---|---|---|---|
| 7,777,155 B2 | 8/2010 | Twelves et al. | |
| 8,383,985 B2 | 2/2013 | Twelves et al. | |
| 8,747,097 B2* | 6/2014 | Pettis | G06F 3/12 264/40.1 |
| 2007/0175875 A1* | 8/2007 | Uckelmann | A61C 13/0013 219/121.85 |
| 2008/0192074 A1 | 8/2008 | Dubois et al. | |
| 2008/0262659 A1 | 10/2008 | Huskamp | |
| 2009/0024243 A1* | 1/2009 | Suh | B23K 26/032 700/119 |
| 2013/0101729 A1* | 4/2013 | Keremes | B29C 67/0051 427/8 |

FOREIGN PATENT DOCUMENTS

| | | |
|---|---|---|
| EP | 2 277 687 | 1/2011 |
| JP | H11-30595 | 2/1999 |
| JP | 2007-504016 | 3/2007 |
| JP | 2008-254241 | 10/2008 |
| WO | WO 01/81031 | 11/2001 |
| WO | WO2007/147221 | 12/2007 |

OTHER PUBLICATIONS

Machine-generated English translation of DE 10 2011 113445.
The State Intellectual Property Office of China, Second Notification of Office Action for related Chinese patent application 201480034533, dated Jul. 13, 2017.
English translation of The State Intellectual Property Office of China, Second Notification of Office Action for related Chinese patent application 201480034533, dated Jul. 13, 2017.
Machine-generated English abstract of CN 1921970, downloaded from Espacenet.com on Sep. 29, 2017.
Machine-generated English translation of the abstract of JP H11-30595, downloaded from Japan Platform for Patent Information on Sep. 12, 2018.
Machine-generated English translation of the abstract of JP 2007-504016, downloaded from Esapcenet.com on Sep. 12, 2018.
Machine-generated English translation of the abstract of JP 2008-254241.
Japan Patent Office, Office action in related Japanese application No. 2016-527998, dated Aug. 14, 2018 (in original Japanese).
English translation of Japan Patent Office, Office action in related Japanese application No. 2016-527998, dated Aug. 14, 2018.

* cited by examiner

QUALITY CONTROL OF ADDITIVE MANUFACTURED PARTS

FIELD

The present disclosure relates to methods and apparatuses for quality control of additive manufactured parts.

BACKGROUND

Additive manufacturing, sometimes called 3D printing, is a relatively new technology that is the process of joining materials to make parts from 3D (three-dimensional) model data, usually layer upon layer. Traditional, subtractive manufacturing techniques create shaped objects by removing material from a larger template. Traditional additive techniques, such as welding, molding, bonding and fastening, are not classified as additive manufacturing because those techniques are not driven by a 3D model nor built essentially layer by layer. Additive manufacturing typically uses a bulk stock material, such as a liquid, granular, or solid material, that is selectively formed into a layer according to an electronic input. Layers are built, typically one on top of the last, until the entire part is formed.

Additive manufacturing allows complex parts to be built without tooling and/or fixtures, and is typically employed for rapid prototyping and non-critical, complex parts. Additive manufacturing may be employed in various industries including consumer products, transportation, aerospace, robotics, medical, military, and academic research.

Additive manufacturing is typically more material efficient than traditional manufacturing. In traditional manufacturing using casting and machining, a large fraction of the stock material is scrapped. In additive manufacturing, the stock material is selectively used to form a layer. The remaining stock material remains essentially unaffected and available for future use. Further, because of the free form nature of additive manufacturing, complex structures may be formed for little to no additional cost, thus enabling low-cost, high strength-to-weight ratio parts desired for aerospace applications. However, present additive manufacturing techniques have limited applicability to supply critical structural components such as aerospace components because the parts built are not typically easy to inspect, especially very complex parts or parts with enclosed surfaces.

SUMMARY

Apparatuses and methods according to the present disclosure provide non-destructive, in-process inspection of additively manufactured parts. Such as-built measurements allow effective quality control and 100% verification of additively manufactured parts. Aerospace applications generally require effective quality control of structural components. The additive manufacturing methods of the present disclosure generally comprise sequentially forming one or more layers of a part from a stock material, based upon an input geometric description. The methods also comprise synchronously acquiring dimensional data about at least a portion of the formed layers. Further, the methods comprise comparing at least some of the geometric description that drives the forming to the dimensional data that describes the partially fabricated part. If performed iteratively, the forming and acquiring will create a finished part and a 3D model of the part as-built, including any interior surfaces.

DESCRIPTION

Figure 1:
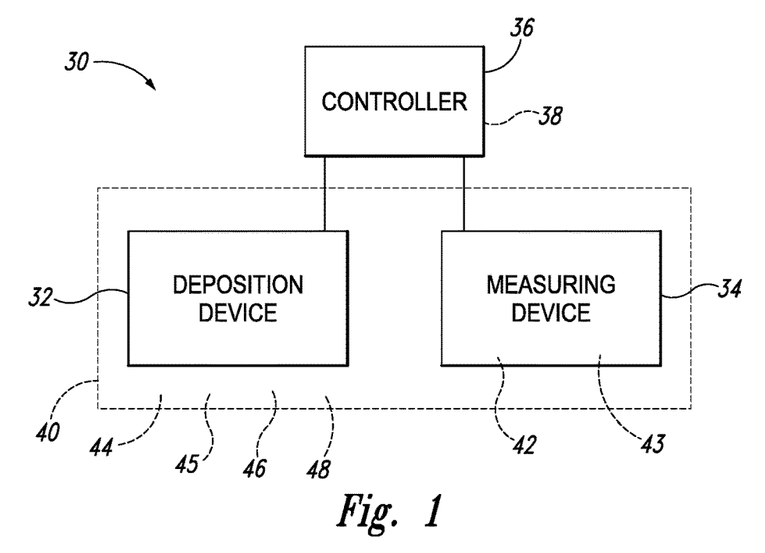
FIG. 1 is a schematic representation of an additive manufacturing apparatus according to the present disclosure.
Figure 2:
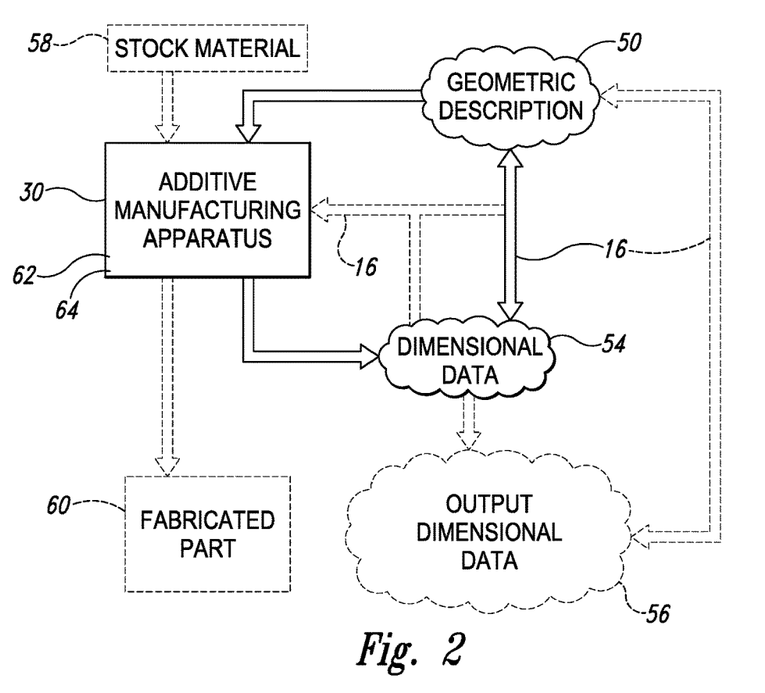
FIG. 2 is a schematic representation of the process flow when using an additive manufacturing apparatus according to the present disclosure.

The present disclosure relates to methods and apparatuses for quality control of additive manufactured parts. FIGS. 1-2 schematically present apparatuses and uses of the apparatuses for quality control during additive manufacturing.

Additive manufacturing takes as input a geometric description 50 of the desired fabricated part 60, for example from CAD software or from a 3D scanner, and transforms the geometric description 50 into thin, virtual, layer-wise cross-sections. The manufacturing process proceeds by sequentially forming layers 62 of stock material 58, one on top of another, following the pattern of the geometric description 50 cross-sections. As these layers 62 are formed, they are formed to the previously formed layers 62, creating a partially complete, in-process part 64. The forming process is typically repeated until all layers are formed and the entire fabricated part 60 is built.

Additive manufacturing apparatuses 30 work directly from the geometric description 50, or model, generally requiring no specialized tooling to create the fabricated part 60. Limitations imposed by traditional manufacturing, like molding and machining, do not generally apply. Thus, fabricated parts 60 may take more free-form shapes than traditionally manufactured parts.

An additive manufacturing apparatus 30 with quality control according to the present disclosure comprises a deposition device 32, to form the layers 62, a dimensional measuring device 34, to acquire dimensional data 54 of one or more layers 62 already formed, and a controller 36 programmed to perform and/or control the methods, including forming, acquiring, and comparing, as described further below. The controller 36 includes, and optionally is, a computer 38.

Apparatuses 30 may further comprise a fabrication chamber 40 where layers 62 are formed on the in-process part 64. Where the apparatus 30 includes a fabrication chamber 40, the deposition device 32 and/or the dimensional measuring device 34 may be at least temporarily, and in some embodiments fully, located within the fabrication chamber 40. In particular, the deposition device 32 is typically located within the fabrication chamber 40 while one or more layers 62 are being formed. Likewise, the dimensional measuring device 34 is typically located within the fabrication chamber 40 while one or more layers 62 are being measured.

Apparatuses 30 may further comprise a base tray 44 that generally supports the in-process part 64, and, in particular, is the underlying support for the first of the layers 62. As the fabricated part 60 is a three dimensional object, the apparatus 30 also may include one or more stages to move the deposition device 32 and the in-process part 64, on the optional base tray 44, relative to each other. In this way, the region where a portion of a new layer 62 is formed may be moved. Generally, the formation region is moved laterally in two dimensions to selectively form a layer 62. When the layer is complete, the formation region is moved axially (e.g., vertically) relative to the in-process part 64, such that the apparatus 30 is prepared to create another layer 62 above the last one. Lateral motion may be achieved by one or more lateral stages 45, while axial motion may be achieved by one or more axial stages 46. The stages may be configured to move the deposition device 32 and/or the in-process part 64, optionally on the base tray 44.

Apparatuses 30 may further comprise a stock material supply 48. The stock material supply 48 holds a supply of stock material 58 available to the deposition device 32 to form a layer 62. The stock material supply 48 may optionally supply the apparatus 30 with stock material 58 in response to stock material 58 consumed in the formation of layers 62.

Generally, the apparatus 30 may be configured to perform one or more types of additive manufacturing techniques. The different techniques differ in the ways in which the layers 62 are formed and in which stock materials 58 are compatible. Apparatuses 30 may perform different techniques and/or use different stock materials 58 at different times and/or upon different layers 62. Additionally or alternatively, the different techniques and/or different stock materials 58 may be used simultaneously and/or upon the same layer 62. Illustrative, non-exclusive additive manufacturing techniques include selective laser sintering, direct metal laser sintering, selective heat sintering, electron beam freeform fabrication, electron beam melting, stereolithography, direct droplet deposition, fused deposition modeling, and extrusion. Various techniques and/or combinations of techniques may require the deposition device 32 to include one or more of a laser scanner, a laser, a light source, a heat source, and an electron beam.

Selective laser sintering is a technique that uses a powerful laser to selectively fuse powdered thermoplastic, ceramic, or metal stock material 58 by scanning cross-sections, derived from the geometric description 50, on the surface of a powder bed. After each layer 62 is complete the powder bed with the in-process part 64 is lowered by one layer 62 thickness, a new layer of powdered stock material 58 is applied on top, and the process is repeated until the completed fabricated part 60 is formed.

Direct metal laser sintering is a technique that is similar to selective laser sintering except that it uses a laser beam powerful enough to melt and fuse metal powder grains. The resulting fabricated parts 64 typically have mechanical properties equivalent to bulk materials, with a homogenous structure and no unintentional voids.

Selective heat sintering is a technique that is similar to selective laser sintering except that the heat to melt the powdered stock material 58 is supplied by a finely controlled thermal deposition device 32, similar to a thermal print head.

Electron beam freeform fabrication and electron beam melting are techniques that use a focused ion beam in a vacuum to selectively melt and solidify metallic stock material 58 into layers 62. Electron beam freeform fabrication uses a metallic wire stock material 58. Electron beam melting uses a metallic powder stock material 58.

Stereolithography is a class of techniques that use photopolymerization to form a solid fabricated part 60 from a liquid including a photopolymer stock material 58. A light pattern, typically of ultraviolet (UV) light, may be projected upon a thin layer of stock material 58 which selectively cures the stock material 58 into a solid layer 62. Additionally or alternatively, the light pattern may be written on the thin layer of stock material 58 by a laser scanner. In some embodiments, the stock material 58 may be a thick volume of a viscous liquid and/or a gel. In that case, photopolymerization may be initiated by a multiphoton process (a non-linear absorption of light). Typically, multiphoton techniques use focused infrared (IR) and/or near-infrared (NIR) laser beams scanned through the stock material 58. Photopolymerization only occurs within the focal volume of the light beam. Typically, the beam is swept through the stock material 58 in three dimensions, creating a freeform photopolymerized fabricated part 60. Multiphoton techniques may also be used with thin, liquid stock material 58 as with other stereolithography techniques.

Direct droplet deposition is a class of techniques that eject microdroplets of liquid stock material 58 from the deposition device 32. The stock material 58 may be molten metallic or thermoplastic, in which case the droplets solidify soon after being deposited on a substrate, e.g., a layer 62 and/or the base tray 44. The stock material 58 may be a photopolymer, in which case the droplets require exposure to curing light to solidify. The stock material 58 may be a chemical component of a catalyst-binder system or a catalyst-resin system. All components of the system may be deposited by droplets, or one or more components may be deposited onto a bed of the remaining components. Such techniques also may incorporate inert materials into the fabricated part 60. For example, direct droplet deposition may be used to create sand cast molds incorporating sand bound by binder e.g., by depositing catalyst droplets onto beds of binder coated sand.

Fused deposition modeling and extrusion are techniques that melt and/or extrude thermoplastic or metal stock material 58 into a layer 62. The deposition device 32 has a heated nozzle that can selectively emit melted stock material 58. The emitted stock material 58 rapidly hardens after leaving the nozzle.

Apparatuses 30 generally build fabricated parts 60 from fused layers 62 of stock material 58. Stock materials 58 are typically stored and/or supplied by a stock material supply 48. Stock materials 58 generally have a liquid, solid, and/or granular form, and are generally not gaseous. Illustrative, non-exclusive stock materials include a plastic, a polymer, a photopolymer, an acrylic, an epoxy, a thermoplastic, an ABS plastic, a polycarbonate, a polylactic acid, a biopolymer, a starch, a plaster, a wax, a clay, a metal, a metal alloy, a eutectic metal, a metal powder, an iron alloy, a stainless steel, a maraging steel, an aluminum alloy, a titanium alloy, a nickel alloy, a magnesium alloy, a cobalt chrome alloy, and a ceramic.

Apparatus 30 may be configured to use multiple stock materials 58 during the fabrication of a single fabricated part 60. For example, the stock material supply 48 may supply more than one type of stock material 58. Additionally or alternatively, apparatus 30 may include more than one deposition device 32 and/or more than one stock material supply 48. When an apparatus 30 is so configured, a single fabricated part 60 may be made of multiple stock materials 58, for example, several metal alloys. Different portions of a fabricated part 60, for example an engine turbine, may be made with different materials optimized for different qualities, e.g., one end may be optimized for strength while the other is optimized for heat resistance. Additionally or alternatively, optional support structure, which may be formed with the layers 62, may be formed of a different stock material 58 than the in-process part 64.

Apparatuses 30 comprise a dimensional measuring device 34 which optionally includes one or more energy detectors 42 and/or one or more energy emitters 43. The dimensional measuring device 34 is configured to acquire dimensional data 54 as the layers 62 are being formed, accumulating the layer-wise dimensional data 54. When data at all the desired layers has been acquired, the accumulated, in-process dimension data 54 becomes the output dimensional data 56 that describes the geometric dimensions of the fabricated part 60 as-built.

Dimensional data 54 may be acquired with a variety of techniques. For the in-process parts 64, which may be delicate and may have steep geometries, non-contact techniques are generally used, i.e., no physical probe touches the in-process part 64 and/or the layers 62. Non-contact techniques all generally detect some form of energy emanating from the sample being probed. Suitable energy forms include light, heat, and sound. When the energy is in the form of light, the light may include one or more of visible light, infrared (IR) light, near-infrared (NIR) light, and ultraviolet (UV) light. Energy detectors 42 suitable for light detection include photodetectors, for example a photodiode, a position sensitive device, an array detector, and a CCD (charge coupled device). Energy detectors 42 suitable for heat detection include infrared imagers. Energy detectors 42 suitable for sound detection include ultrasonic transducers.

The dimensional measuring device 34 may use machine vision, 3D optical scanning, photogrammetry, and/or structured light imaging. Depending on the configuration, the dimensional measuring device 34 may generate 2D (two-dimensional) and/or 3D geometric measurements of the in-process part 64. Machine vision is a technique that uses electronic imaging and algorithms to extract geometric information from images of the in-process part 64. 3D optical scanning is a technique which uses light reflection, often from a laser, to calculate the surface geometry of the in-process part 64. Typically the surface location is calculated from the time-of-flight or from triangulation. Photogrammetry is a technique that determines the geometry of the in-process part 64 through analysis of electronic images, commonly multiple images from different angles. Structured light imaging is a technique that projects a pattern of light onto the in-process part 64 and calculates the surface profile from detected distortions of the pattern reflected by the surface of the in-process part 64.

If the dimensional measure device 34 includes and uses an energy emitter 43, the energy emitter imparts energy onto the in-process part 64 and/or the layers 62. Generally, for non-contact measurement, the energy is a radiative form, such as light, heat, and/or sound. Whatever the form of energy, the energy emitter 43 does not typically impart enough energy to damage or otherwise interfere with the in-process part 64, the layers 62, or any of the stock material 58. Energy emitters 43 suitable for light emission include lamps, wide-field illuminators, structured illuminators, lasers, laser scanners, flash lamps, and modulated illuminators. Further, dimensional measuring device 34 may be configured to use ambient light as a supplement or alternative to a light energy emitter 43. Accordingly, an energy detector 42 may be configured to detect ambient light reflected and/or transmitted by the in-process part 64. Energy emitters 43 suitable for heat emission include heaters. Energy emitters 43 suitable for sound emission include ultrasonic transducers.

Dimensional data 54 acquired by the dimensional measuring device 34 may be 2D and/or 3D. If the dimensional data 54 acquired from a layer 62 is 2D then potential variations in the layer 62 thickness might remain unmeasured. In-process dimensional data 54, accumulated from one or more layers 62, and output dimensional data 56, accumulated from all layers 62, are inherently 3D. Dimensional data 54, and output dimensional data 56, may include, optionally may be, a point cloud, a polygon mesh, and/or a 3D representation. Dimensional data 54 additionally may include, or optionally may be, an image and/or a 2D layer representation. The dimensional data 54 and the output dimensional data 56 independently may be collected and/or stored with a lateral resolution of about 0.01 µm, about 0.02 µm, about 0.05 µm, about 0.1 µm, about 0.2 µm, about 0.5 µm, about 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.01-50 µm, about 0.01-5 µm, about 0.02-2 µm, about 0.2-500 µm, about 0.2-50 µm, about 0.2-10 µm, about 1-500 µm, about 1-50 µm, about 1-20 µm, about 5-500 µm, about 5-100 µm, or about 5-50 µm. The dimensional data 54 and the output dimensional data 56 independently may be collected and/or stored with an axial resolution of about 0.05 µm, about 0.1 µm, about 0.2 µm, about 0.5 µm, about 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.05-50 µm, about 0.05-10 µm, about 0.2-5 µm, about 0.5-500 µm, about 0.5-100 µm, about 0.5-50 µm, about 0.5-10 µm, about 2-100 µm, about 2-40 µm, about 10-40 µm, about 40-100 µm, or about 40-500 µm.

Apparatuses 30, and deposition devices 32, form each layer 62 following the pattern of the geometric description 50. Generally, the geometric description 50 is an input to the apparatus 30 operation, and thus is predetermined. Additionally or alternatively, the geometric description 50 may be provided to the apparatus 50 in smaller data sets, corresponding to the one or more layers 62 being formed. The geometric description 50 may include, and optionally is, a point cloud, a polygon mesh, a 2D layer representation and/or a 3D surface representation. In addition to describing at least some of the fabricated part 60, the geometric description 50 may include a description of one or more support structures—structures that provide temporary support of the in-process part 64 and/or layer 62 during the fabrication process. Support structures may be a component of apparatus 30 or may be built with the fabricated part 60.

Figure 3:
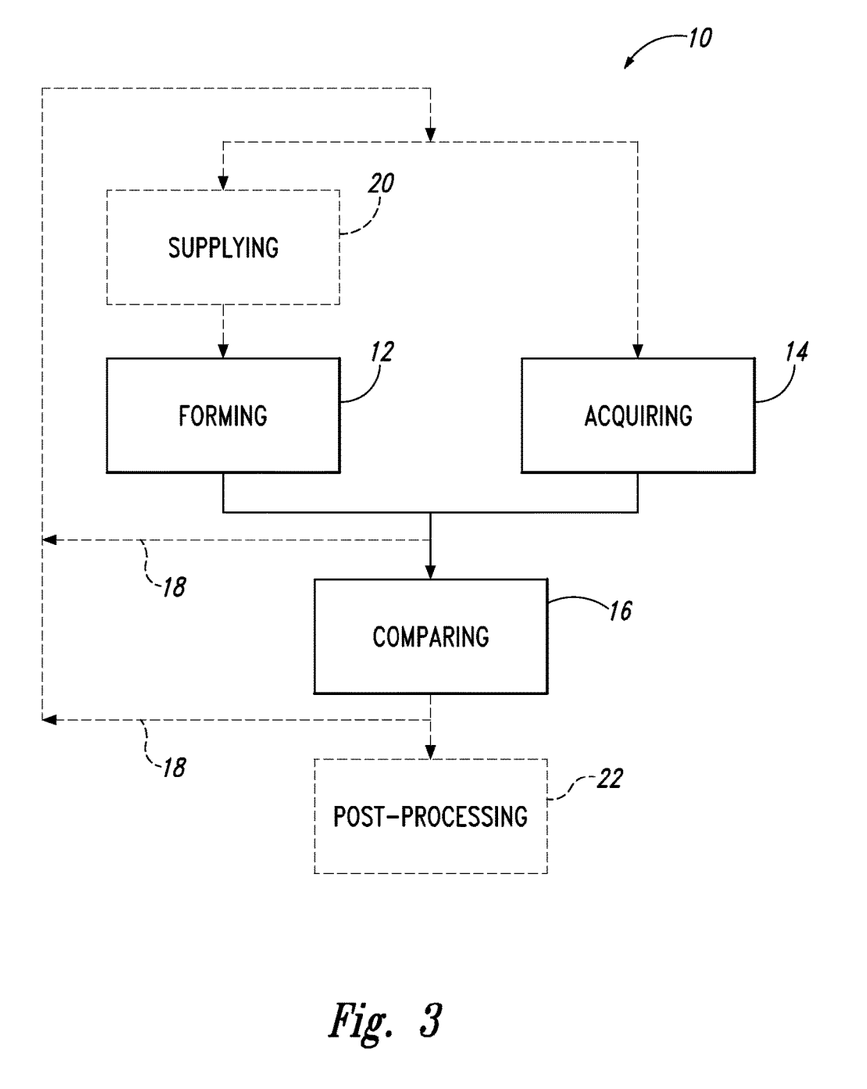
FIG. 3 is a flow diagram of manufacturing methods according to the present disclosure.

Turning to FIG. 3, manufacturing methods 10 for additive manufactured parts with quality control are schematically represented. Manufacturing methods 10 comprise sequentially forming 12 one or more layers 62 based upon a geometric description 50, synchronously acquiring 14 dimensional data 54 about at least a portion of the layers 62, and comparing 16 the geometric description 50 with the dimensional data 54. Forming 12 may be achieved using the techniques and devices described above, including use of apparatuses 30. Manufacturing methods 10 may comprise supplying 20 stock material 58, optionally using a stock material supply 48.

The geometric description 50 of the desired fabricated part 60 may be decomposed into a series of layer-by-layer descriptions of the fabricated part 60. Forming 12 generally includes serially forming the individual layers 62 from the layer descriptions. Forming 12 may include forming a select number of layers 62, where the selected layers include at least one, and less than all, of the layers 62. Each forming 12 results in an in-process part 64, which initially includes the initially selected layers, and which, as forming 12 continues, eventually may include all of the layers 62, and hence the entire fabricated part 60. In addition to layers 62, each forming 12 may include forming one or more temporary support structures that may support layers 62 of the in-process part 64. The thickness of each layer 62 formed may be about 0.2 µm, about 0.5 µm, about 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.2-100 µm, about 0.2-10 µm, about 0.5-10 µm, about 5-500 µm, about 5-100 µm, about 5-50 µm, about 10-40 µm, about 40-100 µm, or about 40-500 µm. The minimum feature size of each layer 62 formed may be about 0.05 µm, about 0.1 µm, about 0.2 µm, about 0.5 µm, 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.05-100 µm, about 0.05-10 µm, about 0.1-2 µm, about 1-500 µm, about 1-50 µm, about 1-20 µm, about 5-500 µm, about 5-100 µm, or about 5-50 µm.

If the geometric description 50 includes any features smaller than the minimum feature size, those features may be misformed. To avoid attempting to form features smaller than the minimum feature size, the geometric description 50 may be filtered to remove features smaller than the minimum feature size. If, upon inspection, features smaller than the minimum feature size are observed on the fabricated part 60, those features may be spurious features, a result of machine malfunction rather than the design input.

The acquiring 14 is synchronous with the forming 12. This means that acquiring 14 is proximate in time with forming 12. Acquiring 14 may be performed sequentially after the forming 12, or may be performed at least partially concurrently with the forming 12. Forming 12 may begin before acquiring 14 begins. Forming 12 may end before acquiring 14 begins and/or before acquiring 14 ends.

Generally, the total time for forming 12 and acquiring 14 combined does not substantially differ from the total time for forming 12 alone. The acquisition time, the time to complete the acquiring 14, may not be significantly more than, may be about equal to, may be less than or equal to, or may be significantly less than the formation time, the time to complete the forming 12. The acquisition time may be less than about 1%, about 10%, about 50%, about 100%, or about 200% of the formation time; or about 1-200%, 1-100%, or 10-50% of the formation time.

Acquiring 14 may include collecting dimensional data 54 about the in-process part 64, a portion of the in-process part 64, the layers 62, or a portion of the layers 62. Where the acquiring 14 collects dimensional data 54 about only a portion of the in-process part 64 or the layers 62, dimensional data 54 may be accumulated to construct a complete model of the in-process part 64 or the layers 62.

Manufacturing methods 10 may comprise repeating 18 the forming 12 and the acquiring 14, and/or may comprise repeating 18 the forming 12, the acquiring 14, and the comparing 16. Repeating 18 may iterate for two or more cycles. Generally, repeating 18 is ceased once the fabricated part 60 is complete (all layers 62 are formed).

After the fabricated part 60 is complete, all layers 62 are formed, and/or the repeating 18 has ceased, the fabricated part 60 part may be subject to one or more post-processing steps 22. Illustrative, non-exclusive example post-processing steps 22 include inspecting the fabricated part, removing a spurious feature from the fabricated part, removing a support structure, surface finishing the fabricated part, annealing the fabricated part, hardening the fabricated part, cleaning the fabricated part, and coating the fabricated part.

Manufacturing methods 10 comprise comparing 16 the input geometric description 50 and the acquired dimensional data 54. Comparing 16 compares at least a portion of the geometric description 50 (i.e., the virtual model of the fabricated part) with at least a portion of the dimensional data 54 (i.e., the actual dimensions of the fabricated part as-built). Comparing 16 may occur as the forming 12 and/or acquiring 14 are occurring, or may occur after the fabricated part 60 is complete. Comparing 16 may include reporting and/or visualizing one or both of some portion of the geometric description 50 and some portion of the dimensional data 54. Visualizing may include outputting to a display device images representative of the comparing 16. Additionally or alternatively, comparing 16 may include reporting and/or visualizing dimensions derived from the geometric description 50 and/or the dimensional data 54.

Comparing 16 typically includes calculating a measured difference between the geometric description 50 and the dimensional data 54. The measured difference may be reported, visualized, or used to affect further processing. For example, the measured difference may be compared to a predetermined tolerance limit. If the measured difference is out of tolerance (outside of, greater than, equal to, or less than the predetermined tolerance limit, as circumstances dictate), the manufacturing methods 10 (including forming 12 and repeating 18) may be ceased, avoiding building a non-compliant fabricated part 60. Ceasing may include an immediate halt, decomposing the in-process part 64, destruction of the in-process part 64, and/or rendering the in-process part visibly non-compliant. Additionally or alternatively, if the measured difference is out of tolerance, comparing may include indicating the result of the comparison and/or the need for post-processing 22, such as inspecting, removing a spurious feature, decomposing, destroying, or marking the indicated fabricated part 60.

The measured difference may be used in a feed-back or feed-forward manner to affect the forming 12. Forming 12 may be based upon forming parameters, such as processing speed, resolution, stock material composition, temperature, and energy applied to the stock material. Where forming 12 is based upon forming parameters, the measured difference may be used to adjust current and/or future forming 12. In particular, where the measure difference is approaching the predetermined tolerance limit, forming parameters may be adjusted to avoid becoming out of tolerance on the next iteration. Additionally or alternatively, where the measured difference is sufficiently different than the predetermined tolerance limit, forming parameters may be adjusted to conserve resources (e.g., time, material, energy) on the next iteration.

Comparing 16 may compare optional support structure if included in the geometric description 50 and the dimensional data 54. Additionally or alternatively, comparing 16 may filter, or otherwise exclude, portions of geometric description 50 and/or dimensional data 54 that correspond to optional support structure. By excluding support structure information, the true, as-built fabricated part dimensions may be compared with the intended design.

Figure 4:
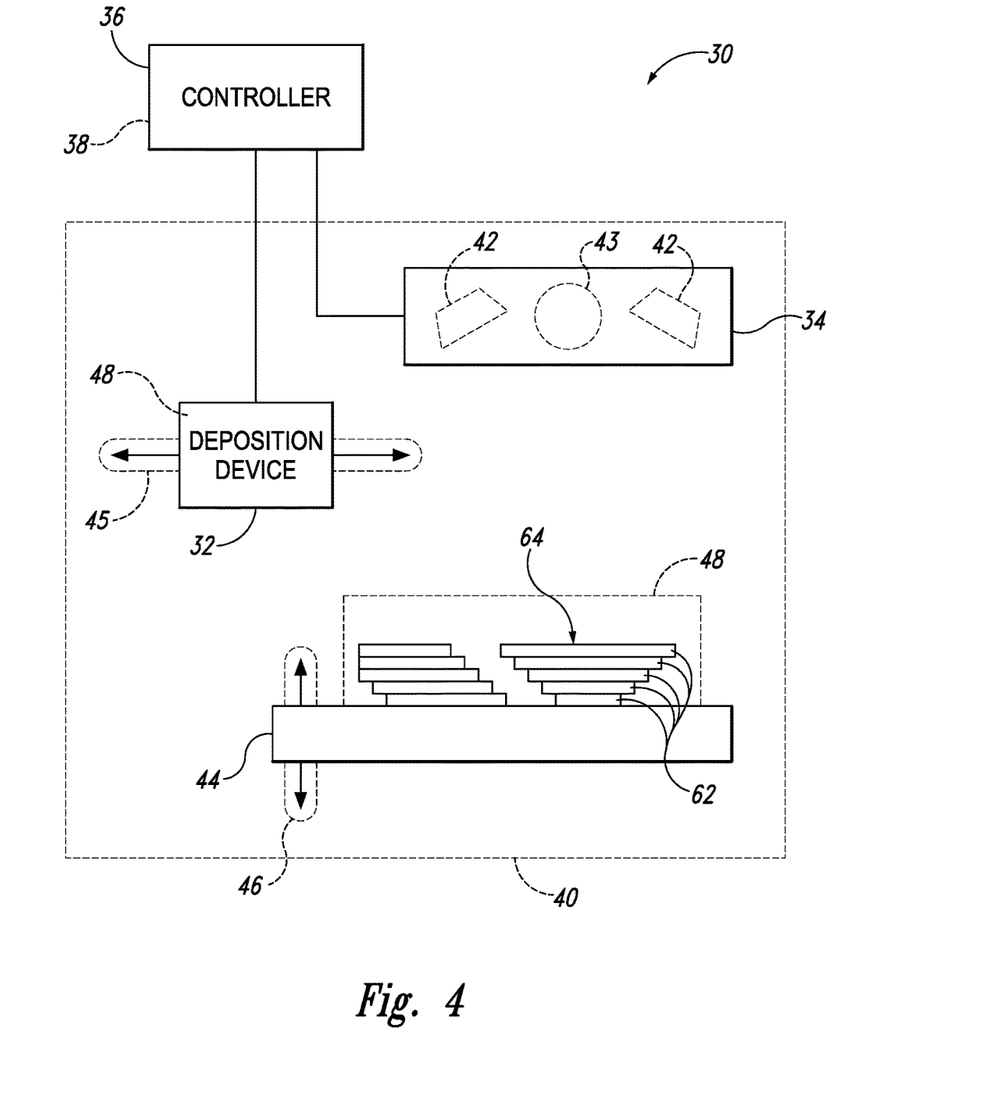
FIG. 4 schematically represents illustrative, non-exclusive examples of additive manufacturing apparatuses according to the present disclosure.

Turning now to FIG. 4, illustrative, non-exclusive examples of additive manufacturing apparatuses 30 with integrated quality control inspection are schematically presented, with the apparatuses 30 optionally being configured to perform and/or facilitate methods 10 according to the present disclosure. Where appropriate, the reference numerals from the schematic illustrations of FIG. 1-3 are used to designate corresponding components of apparatuses 30; however, the examples of FIG. 4 are non-exclusive and do not limit apparatuses 30 to the illustrated embodiments of FIG. 4. That is, apparatuses 30 are not limited to the specific embodiments represented in FIG. 4, and apparatuses 30 may incorporate any number of the various aspects, configurations, characteristics, properties, etc. that are illustrated in and discussed with reference to the schematic representations of FIGS. 1-3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIG. 4; however, it is within the scope of the present disclosure that the previously discussed features, variants, etc. may be utilized with the illustrated embodiments of FIG. 4.

In FIG. 4, apparatus 30 is generally an additive manufacturing machine with a deposition device 32 and an integrated dimensional measuring device 34 for quality control. The deposition device 32 optionally includes a stock material supply 48. The dimensional measuring device 34 optionally includes one or more detectors 42 (two illustrated) and one or more emitters 43 (one illustrated). In this illustration, the dimensional measuring device 34 is illustrated as an optical dimensional measuring device 34. The layers 62 and the in-process part 64 are formed on a base tray 44. The base tray may optionally carry a stock material supply 48. To assist forming layers 62 on the base tray 44, the deposition device 32 may translate along a lateral stage 45, and the base tray 44 may translate along an axial, or vertical, stage 46. The apparatus 30 optionally comprises a fabrication chamber 40 which encloses the deposition device 32, the dimensional measuring device 34, the base tray 44, and the layers 62 as formed.

The deposition device 32 may be configured to move away from the base tray 44 and the in-process part 64, leaving a clear path for non-contact, e.g., optical, interrogation of the in-process part 64 by the dimensional measuring device 34. Additionally or alternatively, the deposition device 32 may afford a clear path to a portion of the in-process part 64 and may move relative to the in-process part 64 to sequentially expose all portions of the in-process part 64. In such case, the dimensional measuring device 34 may collect dimensional data 54 on portions of the in-process part 64 as portions are exposed by the deposition device 32. Further, the dimensional measuring device 34 may be configured to reject data corresponding to the deposition device 32 when the deposition device 32 obscures measurement of a portion of the in-process part 64. Accordingly, the acquiring 14 may be performed at least partially concurrently with the forming 12.

The whole apparatus 30 is controlled by a controller 36, which is optionally a computer 38. The controller 36 coordinates the operation of the deposition device 32 and the dimensional measuring device 34, and may be programmed to perform any of the manufacturing methods 10 previously described.

Illustrative, non-exclusive examples of inventive subject matter according to the present disclosure are described in the following enumerated paragraphs:

A1. A manufacturing and quality control method for fabricating a fabricated part from a series of layers, the method comprising:

sequentially forming one or more layers of the series of layers, using additive manufacturing from a stock material and based upon a geometric description, to form an at least partially completed in-process part;

synchronously acquiring dimensional data about at least a portion of the one or more layers; and comparing at least a portion, optionally all, of the geometric description to at least some, optionally all, of the dimensional data.

A2. The method of paragraph A1, wherein the synchronously acquiring includes acquiring dimensional data about the in-process part after each layer of the series of layers is formed.

A3. The method of paragraph A1, wherein the synchronously acquiring includes acquiring dimensional data about the in-process part after each instance of two or more layers of the series of layers are formed.

A4. The method of any of paragraphs A1-A3, wherein the synchronously acquiring is performed sequentially after the sequentially forming or is performed at least partially concurrently with the sequentially forming.

A5. The method of any of paragraphs A1-A4, wherein the sequentially forming begins before the synchronously acquiring begins.

A6. The method of any of paragraphs A1-A5, wherein the sequentially forming ends before the synchronously acquiring begins.

A7. The method of any of paragraphs A1-A6, wherein the sequentially forming ends before the synchronously acquiring ends.

A8. The method of any of paragraphs A1-A7, wherein the sequentially forming takes a formation time to complete, wherein the synchronously acquiring takes an acquisition time to complete, and wherein the acquisition time is not significantly more than, is about equal to, is less than or equal to, or is significantly less than the formation time.

A9. The method of any of paragraphs A1-A8, wherein the sequentially forming takes a formation time to complete, wherein the synchronously acquiring takes an acquisition time to complete, and wherein the acquisition time is less than about 1%, about 10%, about 50%, about 100%, or about 200% of the formation time; or about 1-200%, 1-100%, 10-50% of the formation time.

A10. The method of any of paragraphs A1-A9, further comprising:

repeating the sequentially forming and the synchronously acquiring until each layer in the series of layers is formed into the fabricated part.

A11. The method of any of paragraphs A1-A10, further comprising:

repeating the sequentially forming, the synchronously acquiring, and the comparing until each layer in the series of layers is formed into the fabricated part.

A12. The method of any of paragraphs A10-A11, further comprising:

after the fabricated part is formed, completing one or more post-fabrication processing steps selected from the group of inspecting the fabricated part, removing a spurious feature from the fabricated part, removing a support structure, surface finishing the fabricated part, annealing the fabricated part, hardening the fabricated part, cleaning the fabricated part, and coating the fabricated part.

A13. The method of any of paragraphs A1-A12, wherein the comparing includes reporting at least some, optionally all, of the dimensional data and/or dimensions derived from the dimensional data.

A14. The method of any of paragraphs A1-A13, wherein the comparing includes reporting a difference between the dimensional data and the geometric description.

A15. The method of any of paragraphs A1-A14, wherein the comparing includes visualizing at least some, optionally all, of the dimensional data.

A16. The method of any of paragraphs A1-A15, wherein the comparing includes visualizing at least some, optionally all, of the geometric description.

A17. The method of any of paragraphs A1-A16, wherein the comparing includes visualizing a difference between the dimensional data and the geometric description.

A18. The method of any of paragraphs A15-A17, wherein the visualizing includes outputting to a display device images representative of the comparing.

A19. The method of any of paragraphs A1-A18, wherein the comparing includes calculating a measured difference between the dimensional data and the geometric description.

A19.1. The method of paragraph A19, wherein the comparing includes comparing a predetermined tolerance limit to the measured difference.

A19.2. The method of any of paragraphs A19-A19.1, further comprising:
ceasing the sequentially forming and/or the repeating the sequentially forming of the in-process part if the measured difference is outside of, greater than, equal to, or less than a predetermined tolerance limit.

A19.3. The method of any of paragraphs A19-A19.2, further comprising:
indicating the need for post-fabrication processing if the measured difference is outside of, greater than, equal to, or less than a predetermined tolerance limit.

A19.4. The method of any of paragraphs A19-A19.3, wherein the sequentially forming includes sequentially forming based upon forming parameters, the method further comprising:
adjusting the forming parameters based upon the measured difference;
optionally wherein the forming parameters include one or more of processing speed, resolution, stock material composition, temperature, and energy applied to the stock material.

A20. The method of any of paragraphs A1-A19.4, wherein the comparing includes excluding from further comparing an element of the geometric description that corresponds to optional support structure.

A21. The method of any of paragraphs A1-A20, wherein the comparing includes excluding from further comparing an element of the dimensional data that corresponds to optional support structure.

A22. The method of any of paragraphs A13-A21, wherein the comparing is performed by a computer.

A23. The method of any of paragraphs A1-A22, further comprising:
supplying the stock material.

A24. The method of any of paragraphs A1-A23, wherein the stock material is one or more of a plastic, a polymer, a photopolymer, an acrylic, an epoxy, a thermoplastic, an ABS plastic, a polycarbonate, a polylactic acid, a biopolymer, a starch, a plaster, a wax, a clay, a metal, a metal alloy, a eutectic metal, a metal powder, an iron alloy, a stainless steel, a maraging steel, an aluminum alloy, a titanium alloy, a nickel alloy, a magnesium alloy, a cobalt chrome alloy, and a ceramic.

A25. The method of any of paragraphs A1-A24, wherein the stock material is one or more of solid, granular, and liquid.

A26. The method of any of paragraphs A1-A25, wherein the stock material is not gaseous.

A27. The method of any of paragraphs A1-A26, wherein the geometric description is predetermined.

A28. The method of any of paragraphs A1-A27, wherein the geometric description includes a description of the fabricated part, and/or the one or more layers.

A29. The method of any of paragraphs A1-A28, wherein the geometric description includes, optionally is, a point cloud, a polygon mesh, a 2D layer representation and/or a 3D surface representation.

A30. The method of any of paragraphs A1-A29, wherein the geometric description includes a description of one or more support structures.

A31. The method of any of paragraphs A1-A30, wherein the forming includes one or more of selective laser sintering, direct metal laser sintering, selective heat sintering, electron beam freeform fabrication, electron beam melting, stereolithography, direct droplet deposition, fused deposition modeling, and extrusion.

A32. The method of any of paragraphs A1-A31, wherein the sequentially forming includes forming one or more support structures.

A33. The method of any of paragraphs A1-A32, wherein a thickness of each of the one or more layers is about 0.2 µm, about 0.5 µm, about 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.2-100 µm, about 0.2-10 µm, about 0.5-10 µm, about 5-500 µm, about 5-100 µm, about 5-50 µm, about 10-40 µm, about 40-100 µm, or about 40-500 µm.

A34. The method of any of paragraphs A1-A33, wherein a minimum feature size of each of the one or more layers is about 0.05 µm, about 0.1 µm, about 0.2 µm, about 0.5 µm, 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.05-100 µm, about 0.05-10 µm, about 0.1-2 µm, about 1-500 µm, about 1-50 µm, about 1-20 µm, about 5-500 µm, about 5-100 µm, or about 5-50 µm.

A35. The method of any of paragraphs A1-A34, wherein the synchronously acquiring includes detecting energy emanating from the portion of the one or more layers.

A35.1. The method of paragraph A35, wherein the detecting includes detecting one or more of light, heat, and sound emanating from the portion of the one or more layers, optionally wherein the light includes one or more of visible light, IR light, NIR light, and UV light.

A36. The method of any of paragraphs A1-A35, wherein the synchronously acquiring includes non-contact detection.

A37. The method of any of paragraphs A1-A36, wherein the synchronously acquiring does not include contacting the portion of the one or more layers.

A38. The method of any of paragraphs A1-A37, wherein the synchronously acquiring includes use of one or more of machine vision, 3D optical scanning, photogrammetry, and structured light imaging.

A39. The method of any of paragraphs A1-A38, wherein the synchronously acquiring includes using a photodetector configured to receive light from the portion of the one or more layers; optionally wherein the photodetector includes one or more of a photodiode, a position sensitive device, an array detector, and a CCD.

A40. The method of any of paragraphs A1-A39, wherein the synchronously acquiring includes imparting energy to the portion of the one or more layers; optionally wherein the energy does not, optionally does not significantly, interfere with the forming, and/or does not, optionally does not significantly, damage the portion of the one or more layers.

A40.1. The method of paragraph A40, wherein the imparting includes illuminating with light, wherein the illuminating optionally includes one or more of transmitting ambient light, wide-field illumination, structured illumination, scanned point illumination, flash illumination, and modulated illumination.

A41. The method of any of paragraphs A1-A40.1, wherein the dimensional data includes, and optionally is, a point cloud, a polygon mesh, an image, a 2D layer representation and/or a 3D surface representation.

A42. The method of any of paragraphs A1-A41, wherein the dimensional data has an axial resolution of about 0.05 µm, about 0.1 µm, about 0.2 µm, about 0.5 µm, about 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.05-50 µm, about 0.05-10 µm, about 0.2-5 µm, about 0.5-500 µm, about 0.5-100 µm, about 0.5-50 µm, about 0.5-10 µm, about 2-100 µm, about 2-40 µm, about 10-40 µm, about 40-100 µm, or about 40-500 µm.

A43. The method of any of paragraphs A1-A42, wherein the dimensional data has a lateral resolution of about 0.01 µm, about 0.02 µm, about 0.05 µm, about 0.1 µm, about 0.2 µm, about 0.5 µm, about 1 µm, about 2 µm, about 5 µm, about 10 µm, about 15 µm, about 20 µm, about 30 µm, about 40 µm, about 50 µm, about 100 µm, about 150 µm, about 200 µm, about 300 µm, about 400 µm, or about 500 µm; and/or about 0.01-50 µm, about 0.01-5 µm, about 0.02-2 µm, about 0.2-500 µm, about 0.2-50 µm, about 0.2-10 µm, about 1-500 µm, about 1-50 µm, about 1-20 µm, about 5-500 about 5-100 µm, or about 5-50 µm.

A44. The method of any of paragraphs A1-A43, wherein the sequentially forming includes depositing the stock material using a deposition device; wherein the synchronously acquiring includes detecting energy emanating from the portion of the one or more layers using an energy detector, and includes moving the deposition device relative to the in-process part to at least partially expose the energy detector to the energy emanating from the portion of the one or more layers.

A45. The method of any of paragraphs A1-A44, wherein the sequentially forming includes depositing the stock material using a deposition device; wherein the synchronously acquiring includes detecting energy emanating from the portion of the one or more layers and energy emanating from the deposition device, and includes rejecting data corresponding to energy emanating from the deposition device.

A46. A fabricated part formed by the method of any of paragraphs A1-A43.

B1. An additive manufacturing apparatus, comprising:
a deposition device;
a dimensional measuring device; and
a controller programmed to control the method of any of paragraphs A1-A45;
wherein the deposition device is configured to perform the sequentially forming, and wherein the dimensional measuring device is configured to perform the synchronously acquiring.

B2. The apparatus of paragraph B1, further comprising one or more of:
a fabrication chamber;
a base tray;
a lateral stage;
an axial stage; and
a stock material supply.

B3. The apparatus of any of paragraphs B1-B2, wherein the deposition device is configured to perform one or more of selective laser sintering, direct metal laser sintering, selective heat sintering, electron beam freeform fabrication, electron beam melting, stereolithography, direct droplet deposition, fused deposition modeling, and extrusion.

B4. The apparatus of any of paragraphs B1-B3, wherein the deposition device includes one or more of a laser scanner, a laser, a light source, a heat source, and an electron beam.

B5. The apparatus of any of paragraphs B1-B4, wherein the dimensional measuring device includes an energy detector, and optionally includes an energy emitter, and optionally when depending from paragraph B2 wherein the energy detector and energy emitter are positioned within the fabrication chamber.

B5.1. The apparatus of paragraph B5, wherein the energy detector includes one or more of a machine vision device, a 3D optical scanner, a photodetector, a photodiode, a position sensitive device, an array photodetector, and a CCD.

B5.2. The apparatus of any of paragraphs B5-B5.1, wherein the energy emitter includes one or more of a lamp, a wide-field illuminator, a structured illuminator, a laser, a laser scanner, a flash lamp, and a modulated illuminator.

B6. The apparatus of any of paragraphs B1-B5.2, wherein when the apparatus comprises a fabrication chamber, the dimensional measuring device is at least temporarily within the fabrication chamber.

B7. The apparatus of any of paragraphs B1-B6, wherein the controller includes, and optionally is, a computer.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A manufacturing and quality control method for fabricating a fabricated part from a series of layers, the method comprising:
   sequentially forming one or more layers of the series of layers, using additive manufacturing from a stock material and based upon a virtual 3D model, to form an at least partially completed in-process part;
   synchronously acquiring a layer-wise surface representation of the one or more layers, using 3D optical scanning;
   repeating the sequentially forming and the synchronously acquiring until the series of layers is fully formed into the fabricated part;
   assembling the layer-wise surface representations of each of the one or more layers of the fabricated part into an as-built 3D model of the fabricated part that is fully formed;
   comparing the virtual 3D model to the as-built 3D model, wherein the comparing includes calculating a measured difference between the as-built 3D model and the virtual 3D model; and
   indicating a need for post-fabrication processing if the measured difference is outside of a predetermined tolerance limit, wherein the post-fabrication processing includes one or more of removing a spurious feature from the fabricated part, removing a support structure, surface finishing the fabricated part, annealing the fabricated part, hardening the fabricated part, cleaning the fabricated part, or coating the fabricated part.

2. The method of claim 1, wherein the synchronously acquiring includes acquiring the layer-wise surface representations of the in-process part after each layer of the series of layers is formed.

3. The method of claim 1, wherein the synchronously acquiring is performed sequentially after the sequentially forming.

4. The method of claim 1, wherein the comparing is performed by a computer and includes reporting a difference between the as-built 3D model and the virtual 3D model.

5. The method of claim 1, wherein the comparing is performed by a computer and includes outputting to a display device images representative of the comparing.

6. The method of claim 1, wherein the comparing includes comparing a predetermined tolerance limit to the measured difference.

7. The method of claim 1, wherein the sequentially forming includes sequentially forming based upon forming parameters, the method further comprising:
   adjusting the forming parameters based upon the measured difference;
   wherein the forming parameters include one or more of processing speed, resolution, stock material composition, temperature, and energy applied to the stock material.

8. The method of claim 1, wherein the synchronously acquiring includes detecting energy emanating from the portion of the one or more layers.

9. The method of claim 1, wherein the synchronously acquiring includes non-contact detection.

10. An additive manufacturing apparatus, comprising:
    a deposition device;
    a dimensional measuring device; and
    a controller programmed to control the method of claim 1;
    wherein the deposition device is configured to perform the sequentially forming, and wherein the dimensional measuring device is configured to perform the synchronously acquiring.

11. The apparatus of claim 10, further comprising:
    a fabrication chamber, within which the deposition device is configured to perform the sequentially forming;
    wherein the dimensional measuring device includes an energy emitter and an energy detector positioned within the fabrication chamber.

12. The method of claim 1, wherein the fabricated part includes an interior surface and the as-built 3D model includes a representation of the interior surface of the fabricated part.

13. The method of claim 1, wherein the as-built 3D model includes at least one of a point cloud, a polygon mesh, and a 3D surface representation.

14. The method of claim 1, wherein the forming includes forming the one or more layers by fused deposition modeling.

15. A manufacturing and quality control method for fabricating a fabricated part from a series of layers, the method comprising:
    sequentially forming layers of the series of layers, using additive manufacturing from a stock material and based upon an input geometric description, to fully form the fabricated part;
    synchronously acquiring, using 3D optical scanning, a 3D surface representation of each layer of the fabricated part, wherein for each layer, synchronously acquiring includes 3D optical scanning a respective layer after the respective layer is formed and before any next layer of the series of layers is formed;
    assembling the 3D surface representations of the series of layers of the fabricated part into an as-built geometric description of the fabricated part that is fully formed;
    comparing, by a computer, the input geometric description to the as-built geometric description, wherein the comparing includes calculating a measured difference between the as-built geometric description and the input geometric description and comparing a predetermined tolerance limit to the measured difference; and
    indicating a need for post-fabrication processing if the measured difference is outside of a predetermined tolerance limit, wherein the post-fabrication processing includes one or more of removing a spurious feature from the fabricated part, removing a support structure, surface finishing the fabricated part, annealing the fabricated part, hardening the fabricated part, cleaning the fabricated part, or coating the fabricated part.

16. An additive manufacturing apparatus, comprising:
    a deposition device;
    a dimensional measuring device; and
    a controller programmed to control the method of claim 15;
    wherein the deposition device is configured to perform the sequentially forming, and wherein the dimensional measuring device is configured to perform the synchronously acquiring.

* * * * *